US011893589B2

(12) United States Patent
Szczepanik et al.

(10) Patent No.: US 11,893,589 B2
(45) Date of Patent: Feb. 6, 2024

(54) AUTOMATED SUPPORT QUERY

(71) Applicant: International Business Machines Corporation, Armonk, NY (US)

(72) Inventors: Grzegorz Piotr Szczepanik, Cracow (PL); Piotr Kalandyk, Zielonki (PL); Pawel Tadeusz Januszek, Cracow (PL); Michal Maciej Zalas, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 17/021,000

(22) Filed: Sep. 15, 2020

(65) Prior Publication Data

US 2022/0084041 A1 Mar. 17, 2022

(51) Int. Cl.
*G06F 11/22* (2006.01)
*G06Q 30/016* (2023.01)
*G06F 11/00* (2006.01)
*G06F 16/33* (2019.01)
*G06F 40/103* (2020.01)
*G06F 40/237* (2020.01)

(52) U.S. Cl.
CPC ......... *G06Q 30/016* (2013.01); *G06F 11/006* (2013.01); *G06F 16/3344* (2019.01); *G06F 40/103* (2020.01); *G06F 40/237* (2020.01); *G06F 2201/865* (2013.01)

(58) Field of Classification Search
CPC ............... G06F 11/006; G06F 16/3344; G06F 2201/865
See application file for complete search history.

(56) References Cited

U.S. PATENT DOCUMENTS

| 5,819,066 A * | 10/1998 | Bromberg ........... G06F 11/3428 706/920 |
| 11,221,907 B1 * | 1/2022 | Sharma ............... G06F 11/0793 |
| 11,429,473 B2 * | 8/2022 | Hecox ................. G06F 11/3051 |
| 2007/0239760 A1 * | 10/2007 | Simon .................... G06Q 10/06 707/999.102 |
| 2008/0046896 A1 * | 2/2008 | Bash ..................... G06F 16/211 719/320 |
| 2012/0191629 A1 * | 7/2012 | Shae ..................... G06F 16/332 706/11 |
| 2018/0150348 A1 * | 5/2018 | Hecox ................. G06F 11/0793 |
| 2018/0203755 A1 * | 7/2018 | Das ..................... G06F 11/0709 |
| 2019/0087707 A1 * | 3/2019 | Cummins ........... G06F 16/3329 |
| 2019/0179608 A1 * | 6/2019 | Kothari .................. G06F 9/453 |
| 2019/0236132 A1 * | 8/2019 | Zhu ........................ G06N 20/00 |
| 2020/0005117 A1 * | 1/2020 | Yuan ...................... G06F 40/35 |

(Continued)

OTHER PUBLICATIONS

"Method and System for Implementing Intelligent Reasoning Agents or Chatbots", An IP.com Prior Art Database Technical Disclosure, IP.com No. IPCOM000259683D, IP.com Electronic Publication Date: Sep. 6, 2019, 6 pages.

(Continued)

*Primary Examiner* — Kamini B Patel
(74) *Attorney, Agent, or Firm* — Scott S. Dobson

(57) ABSTRACT

Support queries are automatically provided. An error is identified during execution of an application. A support query for the error is produced using the source code for the application with the support query including context information for the error. The support query is displayed to a user.

20 Claims, 4 Drawing Sheets

(56) References Cited

U.S. PATENT DOCUMENTS

2020/0007474 A1* 1/2020 Zhang ..................... G09B 7/02
2020/0143247 A1* 5/2020 Jonnalagadda ........ G06N 3/044
2020/0226475 A1* 7/2020 Ma ......................... G06N 3/084
2021/0256534 A1* 8/2021 An .......................... G06F 40/216
2022/0413922 A1* 12/2022 Hamlin .................. G06F 9/5027

OTHER PUBLICATIONS

Athreya et al., "Enhancing Community Interactions with Data-Driven Chatbots—The DBpedia Chatbot", WWW '18 Companion, Apr. 23-27, 2018, Lyon, France, 5 pages.

Rivero, "Next generation of chatbots with NLP services and Graphs", Oct. 5, 2018, Chatbots Life, 11 pages. https://chatbotslife.com/next-generation-of-chatbots-with-nlp-services-and-graphs-cd811a8165d7.

Jalota et al., "An Approach for Ex-Post-Facto Analysis of Knowledge Graph-Driven Chatbots—The DBpedia Chatbot", Conversations 2019, LNCS 11970, 2020, https://doi.org/10.1007/978-3-030-39540-7_2, 16 pages.

* cited by examiner

AUTOMATED SUPPORT QUERY

BACKGROUND

The present disclosure relates to computer error handling, and more specifically, to error handling in software applications.

Exceptions are anomalous or exceptional conditions that require special processing. Computer programs can be configured to break the normal flow of execution in response to the occurrence of exceptions.

Automated support systems allow users access to potential solutions for their questions without communicating with a real person. These systems allow a user to enter a query and provide one or more potential solutions to the user in response to the query. Some automated support systems utilize a chatbot to receive natural language questions from a user. In response to the user question, the chatbot can search a support knowledge database and return the most likely solutions to the user. If the solutions provided by the chatbot do not address the user's problem, the user may request that the chatbot identify different possible solutions.

SUMMARY

According to embodiments of the present disclosure, a computer-implemented method for providing support queries is disclosed. The method includes identifying an error during execution of an application. A support query for the error is produced using the source code for the application with the support query including context information for the error. The support query is displayed to a user. Further disclosed herein are a computer program product and a system for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
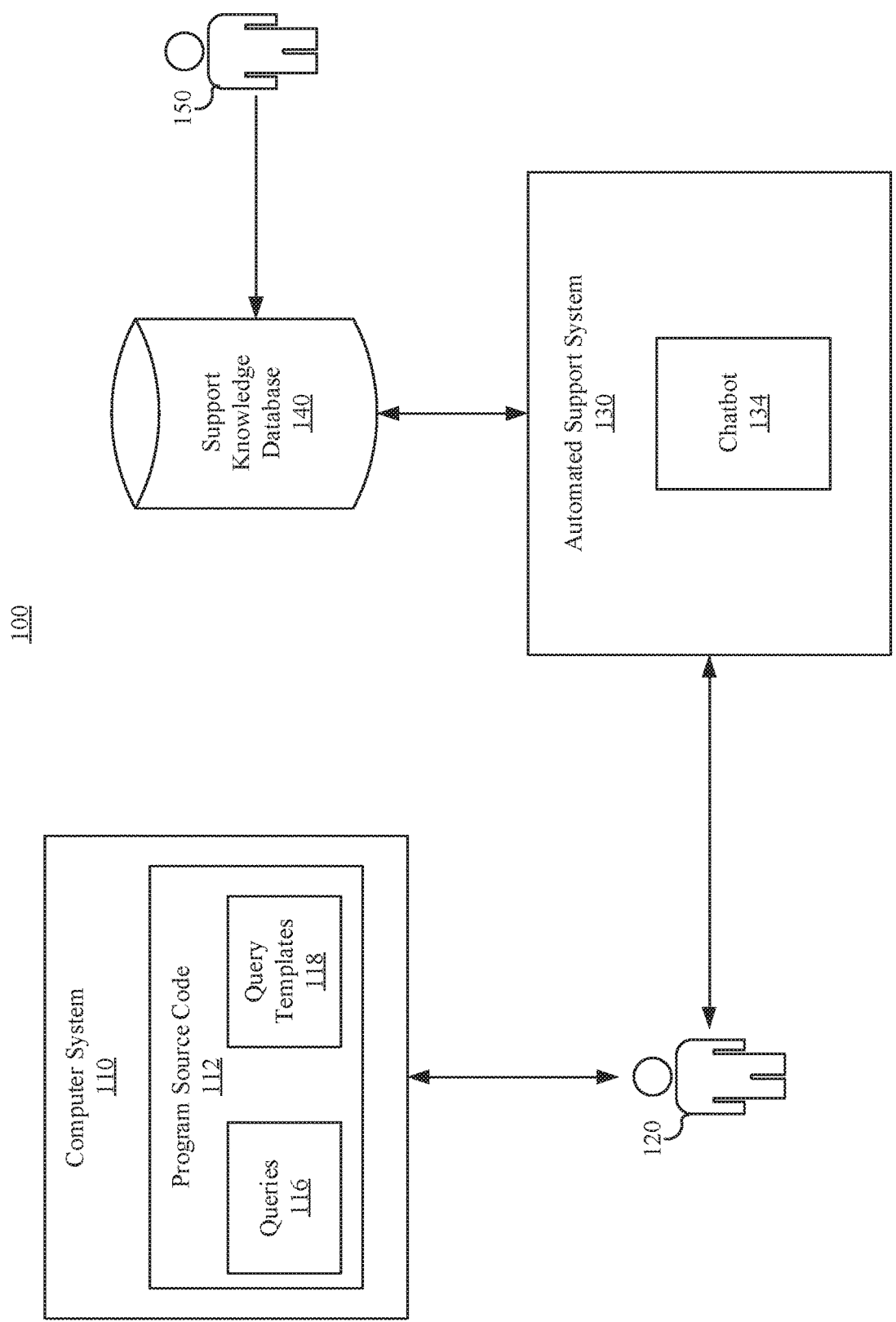
FIG. 1 depicts a block diagram of an example computing environment according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated providing of support queries for software exceptions, and more particular aspects relate to generating queries for support chatbots in response to software exceptions. While the present disclosure is not necessarily limited to such applications, various aspects of the disclosure may be appreciated through a discussion of various examples using this context.

Automated support systems allow users to identify solutions to their problems without talking to an actual support person. This provides users with the ability to access solutions at any time by providing a query, without the need to wait for a live person. However, automated support systems may not find the correct solution to a user's problem if the query entered by the user does not contain the correct keywords to identify the solution. When a user encounters an error, they may not know the appropriate keywords to provide to the automated support system to obtain the correct solution.

Embodiments of the present disclosure provide for automated generation of support queries for automated support systems in response to errors during the execution of a program. The source code of the program encountering an error may be configured to automatically generate a support query for an automated support system when the error occurs based on context information for the error. As used herein, context information may include any information that would help identify a solution to the error. The full query may be hard-coded into the source code of the program or the query may be generated automatically when an error is encountered, for example, using a template with one or more variable in the source code.

While the solution to a given error may not be known at the time an application is published, certain exceptions and the context of the exceptions are known to an application developer. Developers create code to identify anomalous or exceptional conditions that require special processing. Thus, the developer may create a query or query template for each exception that describes the context of the exception such that an automated support system may identify an appropriate solution in a support knowledge database. As errors are identified over time, support teams may create documents that outline solutions to the errors. These solutions can be stored in the support knowledge database for use by the automated support system. Further, the support teams may know the query generated in response to a particular error such that the solution may be stored with identifying information that causes the solution to be retrieved using the generated query. For example, support teams may include keywords from the generated query in the title of the document, the body of the document, or metadata associated with the document.

In some embodiments, a developer may create a hard-coded query in an exception block of the source code, such that the exception block is configured to provide the query to a user without modification when an exception occurs. In some embodiments, a developer may create a query template with one or more variables that are filled during runtime such that the details of the query can change based on the conditions at runtime. For example, a query template could be "How to configure $OS_drive to avoid error $ERR_number raised by $CMP_name component". The template could generate the query "How to configure zfs to avoid error 34 raised by scanner component" based on the values of the variables at runtime.

The queries may include exception context information including, for example, instance/module name, version number, error code, and specific keywords related to the error causing the exception. Further, the query may include information about the system that the program is executing in such as, for example, the operating system. In some embodiments, for example in the case of a database error, the exception block may be configured to add a record to the query or query template. The record may specify instance/ module name, context procedure, and specific keywords as well. For example, for a time-out class database error, an example query template could be "How to increase performance for $DB_tablespace in $DB_Name $DB_Version".

In some embodiments, the user enters the provided support query into a window for communication with a support chatbot. Support chatbots may be configured to interpret queries provided by a user in natural language. Thus, in some embodiments, the queries are formatted in the form of a question using words such as what, where, why, or how. In other embodiments, the user may enter the query into a search engine.

Aspects of the present disclosure may provide a user a more complete and accurate support query in response to an error than the user would be able to produce themselves to assist the user in retrieving a solution to the error. Aspects of the present disclosure may be particularly useful for users with less technical knowledge. The following examples illustrate differences in how a user may enter a question into a chatbot for an error compared to a program query automatically provided according to embodiments of the present disclosure:

1. Software scanner failed
   User question: "After upgrade to system version 1.0.0.1, the scanner fails. How do I solve this problem?"
   Program query: "How to fix scanner 2.0.0 error number 25"
2. System Error
   User question: "We wanted to create a report, but it hangs. We've checked the log and found a java error. Please help us urgently because we need to deliver the report today."
   Program query: "How to fix Java ERROR: (no space) logged in system.log for license report version 3.5"
3. Connection problem
   User question: "This afternoon my colleagues are unable to connect to the system console. I checked and the database is not responding, please help."
   Program query: "How to fix MS SQL error 128. Raised in system console version 3.0 while JDBC v. 3.0 connect to localhost on port 538."
4. Wrong configuration
   User question: "We cannot access our virtualization system. I'm the administrator."
   Program query: "How to set SSL communication to vCenter 6.7 on Windows 2012"

Referring now to FIG. 1, a block diagram of an example computing environment 100 is depicted according to embodiments. Computing environment 100 includes computer system 110 and automated support system 130. User computer system 110 may be any suitable computing device such as, for example, computer system 401 described in reference to FIG. 4. Computer system 110 may be configured to provide a query to user 120 in response to a error running a program. User 120 may provide the query to automated support system 130. Automated support system 130 may be configured to search support knowledge database 140 based on the query and provide one or more solutions to user 120.

User computer system 110 may configured to execute a program using program source code 112. Program source code 112 contains queries 116 and query templates 118. The program source code 112 may be configured to cause computer system 110 to provide user 120 with a query from queries 116 or a query generated from one of the query templates 118 in response to an error encountered during execution of the program.

The program source code 112 may be configured to cause computer system 110 to display a query to user 120 via a connected display device. For example, a window containing the query may be displayed in a graphical user interface. Displaying the query may allow user 120 to provide the query to automated support system 130, for example, using a different computing system.

While FIG. 1 depicts user 120 providing the query to automated support system 130, in some embodiments the query may be communicated to the automated support system by computer system 110. For example, user 120 may access automated support system 130 and provide the query to the automated support system via a program on computer system 110. The program may be, for example, a web browser or automated support system client executing on computer system 110. In some embodiments, user 120 may use a copy/paste feature of computer system 110 to copy a displayed query into a field of a program used for communication with automated support system 130.

In some embodiments, the source code may be configured to provide a link with the query that directs the user to the automated support system. The query itself may act as a hyperlink such that it directs the user to automated support system 130 when a user selects the query. Alternatively, the link could be provided separately from the query. The link may cause computer system 110 to open a local program for communicating with automated support system 130. The link could include a web address for accessing automated support system 130.

Automated support system 130 could be implemented using any suitable computing system. In some embodiments, automated support system and support knowledge database 140 may be implemented in a cloud computing environment. Automated support system 130 may be configured to communicate with user computing devices, such as computer system 110, over one or more networks.

Automated support system 130 may include a chatbot 134 for communicating with users such as user 120. Chatbot 134 may be configured to receive and respond to users using natural language to simulate the way a human would respond to a user. For example, chatbot 134 may receive a question from a user, process the question using natural language processing, and provide a response to the user. Chatbot 134 may process input received from user 120, determine that the user is asking for a solution using natural language processing, search support knowledge database 140 based on the processed user input, and provide one or more solutions to user 120 based on relevancy.

Queries produced based on the program source code 112 may be specifically designed to be processed by chatbot 134. For example, the queries may be formatted in the form of a question that will be recognized by chatbot 134 such that the chatbot will search support knowledge database 140 using information provided in the query.

Support knowledge database 140 may contain solutions to known problems that have been identified. In some embodiments, the support knowledge database contains a separate document for each solution. Support knowledge database may be updated over time by support engineers 150 as new solutions are generated over time. Support engineers may identify problems such as those raised by users over time, develop solutions, and store the solutions in support knowledge database 140. The support engineers may draft documents outlining the solutions and store the documents in support knowledge database 140.

Support engineers 150 may include information describing the error associated with the solution such that the solution can be identified by searching based on an error. For example, keywords associated with the problem may be included in the title, body, or metadata of a solution document. Given the knowledge of the query that will be produced by the program in response to an error, a support engineer can include keywords specifically designed to cause the solution to be retrieved by the automated support system in response to the query generated by the program. Thus, embodiments of the present disclosure may allow for the correct solution to be identified easily with a single query produced by the program associated with the error.

Figure 2:
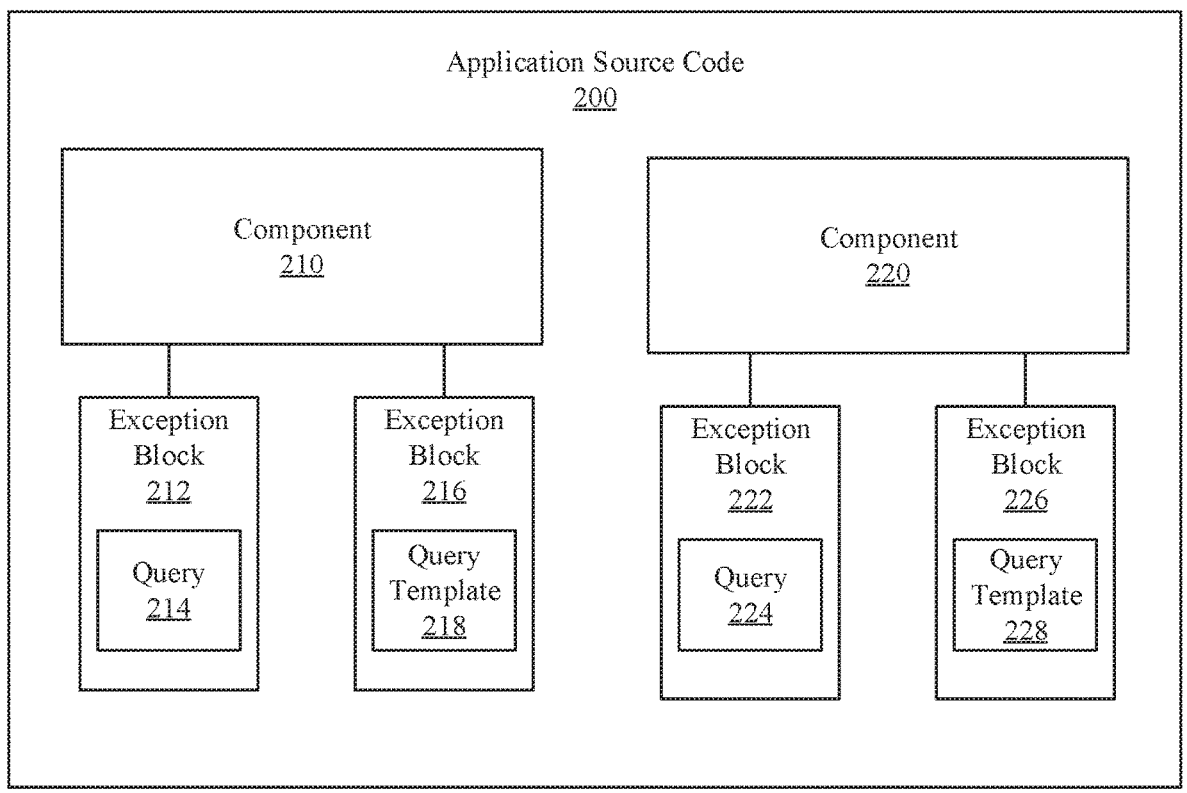
FIG. 2 depicts a block diagram representation of an example application source code according to embodiments.

Referring now to FIG. 2, a block diagram representation of an example application source code 200 is depicted. Source code 200 may include components 210 and 220. The components 210 and 220 may be configured to identify exceptions during runtime. In response to identifying an exception, components 210 and 220 may halt normal execution and refer to an exception block. Exception blocks 212 and 216 may be associated with exceptions identified in the execution of component 210. Exception blocks 222 and 226 may be associated with exceptions identified in the execution of component 220. Each exception block contains either a query or a query template associated with the particular exception that the exception block is associated with. For example, query 214 and query template 218 may include identification of component 210 among other keywords associated with the particular exception. Similarly, query 224 and query template 228 may include identification of component 220 among other keywords associated with the particular exception. Thus, when the user is provided with the appropriate query, the specific component will be identified and solutions focused on the particular component may be retrieved from an automated support system.

Figure 3:
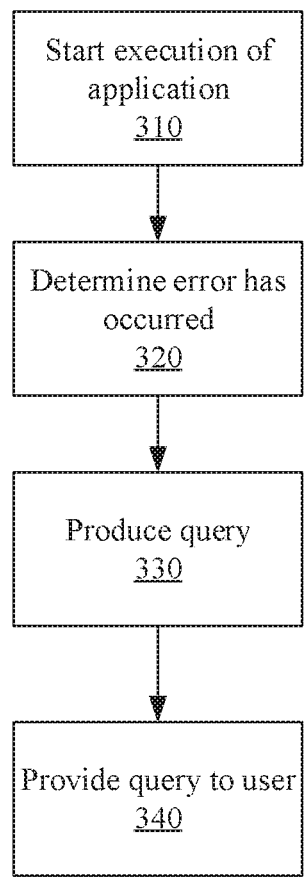
FIG. 3 depicts a flowchart of an example method for automatically providing a support query to a user according to embodiments.

Referring now to FIG. 3, a flowchart of an example method 300 for automatically providing a support query to a user by a computer system is depicted according to embodiments. At operation 310, the computer system starts execution of an application. At operation 320, the computer system determines that an error has occurred. For example, the application may identify an exception such as an anomalous value that requires special processing. In response to identifying the exception, the computer system may produce a query at operation 330. In some embodiments, the query may be hard-coded into an exception block in the source code of the program. In some embodiments, the query may be generated using a query template in an exception block in the source code, where the query template includes variables that are filled during runtime. At operation 340, the computer system provides the query to a user. In some embodiments, the computer system may display the query on a graphical user interface on a connected display device.

Figure 4:
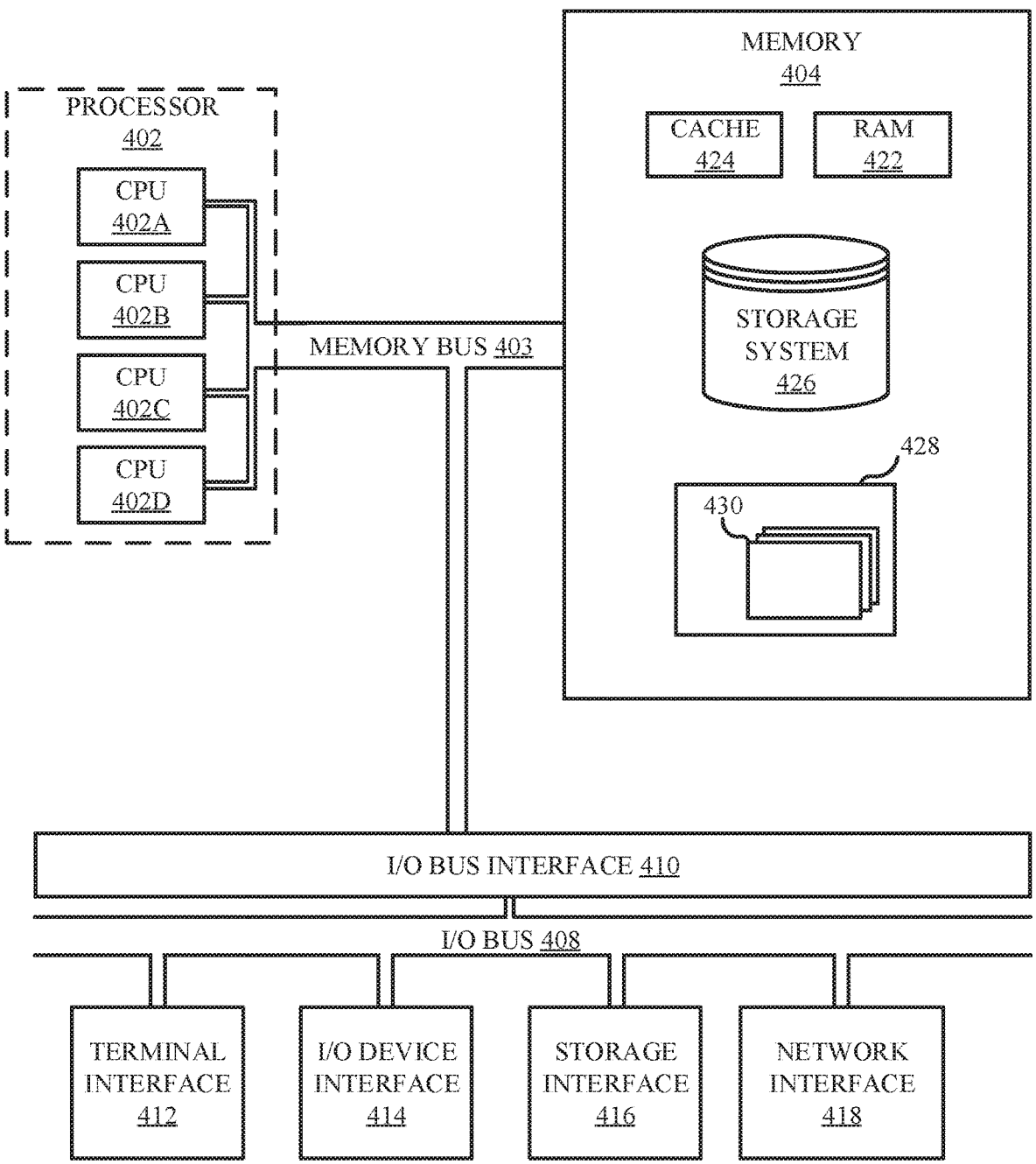
FIG. 4 depicts a high-level block diagram of an example computer system according to embodiments.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    automatically identifying an error during execution of an application;
    in response to automatically identifying the error, automatically producing a support query for the error using source code for the application, the support query including context information for the error; and
    displaying the support query to a user.

2. The method of claim 1, wherein identifying the error includes identifying an exception and producing the support query occurs in response to executing the exception.

3. The method of claim 2, wherein the support query is hard-coded into an exception block in the source code.

4. The method of claim 2, wherein producing the support query comprises generating the support query using a query template in an exception block in the source code, the query template comprising one or more variables filled during runtime.

5. The method of claim 1, wherein the support query is formatted in the form of a question for a chatbot.

6. The method of claim 1, further comprising displaying a link to an automated support system with the support query.

7. The method of claim 1, wherein the context information includes instance name and version number.

8. A computer program product comprising one or more computer readable storage media and program instructions collectively stored on the one or more computer readable storage media, the program instructions executable by one or more processors to cause the one or more processors to perform operations comprising:
    automatically identifying an error during execution of an application;
    in response to automatically identifying the error, automatically producing a support query for the error using source code for the application, the support query including context information for the error; and
    displaying the support query to a user.

9. The computer program product of claim 8, wherein identifying the error includes identifying an exception and producing the support query occurs in response to executing the exception.

10. The computer program product of claim 9, wherein the support query is hard-coded into an exception block in the source code.

11. The computer program product of claim 9, wherein producing the support query comprises generating the support query using a query template in an exception block in the source code, the query template comprising one or more variables filled during runtime.

12. The computer program product of claim 8, wherein the support query is formatted in the form of a question for a chatbot.

13. The computer program product of claim 8, wherein the operations further comprise displaying a link to an automated support system with the support query.

14. The computer program product of claim 8, wherein the context information includes instance name and version number.

15. A system, comprising:
one or more processors; and
one or more computer-readable storage media, coupled to the one or more processors, storing program instructions that, when executed by the one or more processors, cause the one or more processors to perform operations comprising:
automatically identifying an error during execution of an application;
in response to automatically identifying the error, automatically producing a support query for the error using source code for the application, the support query including context information for the error; and
displaying the support query to a user.

16. The system of claim 15, wherein identifying the error includes identifying an exception and producing the support query occurs in response to executing the exception.

17. The system of claim 16, wherein the support query is hard-coded into an exception block in the source code.

18. The system of claim 16, wherein producing the support query comprises generating the support query using a query template in an exception block in the source code, the query template comprising one or more variables filled during runtime.

19. The system of claim of claim 15, wherein the support query is formatted in the form of a question for a chatbot.

20. The system of claim 15, wherein the context information includes instance name and version number.

* * * * *